US012580171B2

(12) United States Patent
Kim et al.

(10) Patent No.: US 12,580,171 B2
(45) Date of Patent: Mar. 17, 2026

(54) PASSIVATED CURRENT COLLECTOR FOR A BATTERY CELL

(71) Applicant: Rivian IP Holdings, LLC, Irvine, CA (US)

(72) Inventors: Ki Woon Kim, Milpitas, CA (US); Sun Kim, Camas, WA (US); Sanket Sudam Mundhe, Fremont, CA (US); Yunki Baik, San Jose, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 589 days.

(21) Appl. No.: 17/858,207

(22) Filed: Jul. 6, 2022

(65) Prior Publication Data

US 2024/0014368 A1 Jan. 11, 2024

(51) Int. Cl.
| | |
|---|---|
| *H01M 4/04* | (2006.01) |
| *H01M 4/66* | (2006.01) |
| *H01M 10/0525* | (2010.01) |
| *H01M 50/534* | (2021.01) |
| *H01M 10/0585* | (2010.01) |

(52) U.S. Cl.
CPC ......... *H01M 4/0404* (2013.01); *H01M 4/661* (2013.01); *H01M 10/0525* (2013.01); *H01M 50/534* (2021.01); *H01M 10/0585* (2013.01); *H01M 2220/20* (2013.01); *Y02E 60/10* (2013.01)

(58) Field of Classification Search
CPC .............. H01M 4/0404; H01M 4/661; H01M 10/0525; H01M 10/0587; H01M 10/0431; H01M 10/0585; H01M 2220/20; H01M 50/534; Y02E 60/10
See application file for complete search history.

(56) References Cited

U.S. PATENT DOCUMENTS

| | | | | |
|---|---|---|---|---|
| 5,518,839 A * | 5/1996 | Olsen | .................... | H01M 4/661 |
| | | | | 429/312 |
| 5,578,399 A * | 11/1996 | Olsen | .................. | H01M 10/052 |
| | | | | 429/212 |
| 2013/0330581 A1* | 12/2013 | Kim | .................... | H01M 50/176 |
| | | | | 429/61 |
| 2014/0377638 A1* | 12/2014 | Kwak | ................. | H01M 50/583 |
| | | | | 429/178 |
| 2015/0079429 A1* | 3/2015 | Han | .................... | H01M 50/593 |
| | | | | 429/61 |
| 2015/0194657 A1* | 7/2015 | Kim | ......................... | H01M 6/46 |
| | | | | 429/161 |
| 2016/0013455 A1* | 1/2016 | Shiu | .................... | H01M 50/178 |
| | | | | 156/227 |
| 2016/0118691 A1* | 4/2016 | Goh | .................. | H01M 10/0569 |
| | | | | 429/343 |
| 2019/0280300 A1* | 9/2019 | Maeda | .................. | H01M 4/525 |

* cited by examiner

*Primary Examiner* — Milton I Cano
*Assistant Examiner* — Katherine J Metzger
(74) *Attorney, Agent, or Firm* — Foley & Lardner LLP

(57) ABSTRACT

A passivated current collector for a battery cell is provided. A battery cell can include a first electrode that can include a first region that is coated with an active material and a second region that lacks a coating of the active material. The battery cell can include a first terminal that can be in electrical contact with the first electrode via a first current collector that can be electrically coupled to the second region of the first electrode and the first terminal. The first current collector can include a passivated portion exposed to an electrolyte in contact with the first electrode.

20 Claims, 10 Drawing Sheets

500

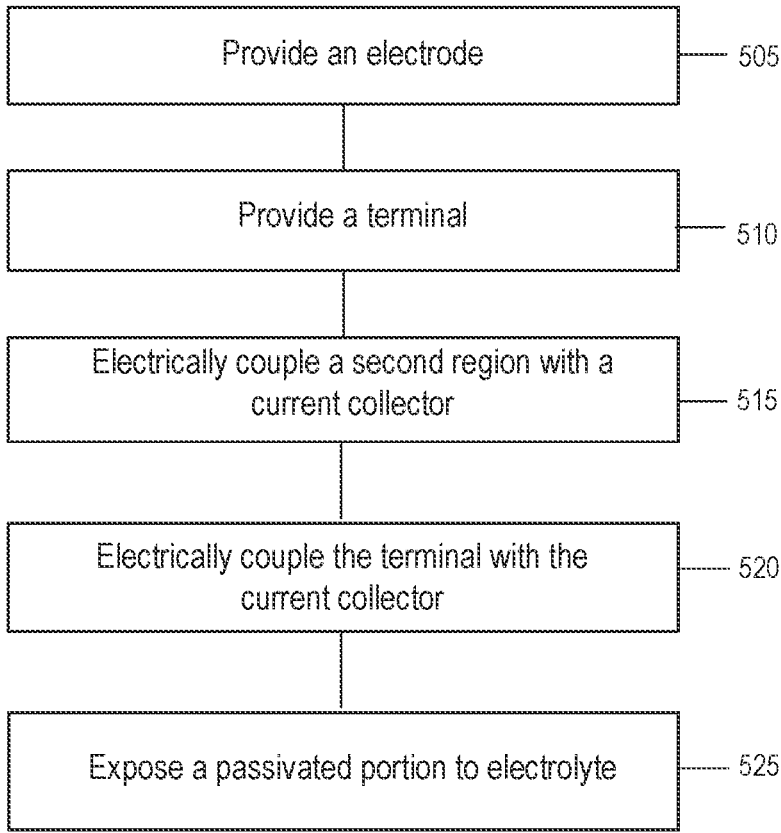

```
┌─────────────────────────────────────┐
│        Provide an electrode         │──── 505
└─────────────────────────────────────┘
                  │
┌─────────────────────────────────────┐
│          Provide a terminal         │──── 510
└─────────────────────────────────────┘
                  │
┌─────────────────────────────────────┐
│  Electrically couple a second region with a  │──── 515
│           current collector         │
└─────────────────────────────────────┘
                  │
┌─────────────────────────────────────┐
│   Electrically couple the terminal with the  │──── 520
│           current collector         │
└─────────────────────────────────────┘
                  │
┌─────────────────────────────────────┐
│  Expose a passivated portion to electrolyte  │──── 525
└─────────────────────────────────────┘
```

Provide a battery cell ——— 605

FIG. 6

PASSIVATED CURRENT COLLECTOR FOR A BATTERY CELL

Electric vehicles can use energy stored in batteries to power electric motors and produce motion. The batteries can include different components facilitating the energy storage.

SUMMARY

The present solution is generally directed to a passivated current collector for a battery cell. For example, the technology can include a prismatic lithium ion battery cell in which an electrode, such an anode, can include an aluminum material. The electrode can be passivated using a material that is different from aluminum. By passivating the aluminum with a different material, this technology can prevent, mitigate, slow down, or otherwise reduce a corrosive reaction that lithium-based electrolyte can have with the aluminum material. This corrosive reaction may preclude the usage of aluminum in anode-side current collection of lithium ion batteries. Passivation can include, for example, coating the aluminum anode-side current collector with a material that is non-reactive with lithium electrolyte. The present solution can provide for a prismatic lithium-ion battery cell with an aluminum anode-side current collector that is passivated with a material non-reactive with the lithium-based electrolyte, thereby improving performance of the battery cell as well as efficiency of fabrication of the battery cell. This passivation can insulate the portion of the aluminum anode current collector interacting with the electrolyte, which in turn can allow for the benefits of this design without the corrosive electrolyte reaction.

At least one aspect is directed to a battery cell. The battery cell can include a first electrode. The first electrode can include a first region that is coated with an active material. The first electrode can include a second region that lacks a coating of the active material. The battery cell can include a first terminal and a first current collector. The first current collector can be electrically coupled to the second region of the first electrode and the first terminal. The first current collector can include a passivated portion that is exposed to an electrolyte in contact with the first electrode.

At least one aspect is directed to a method for a battery cell. The method can provide a first electrode. The first electrode can include a first region that is coated with an active material. The first electrode can include a second region that lacks a coating of the active material. The method can provide a first terminal. The method can electrically couple the second region of the first electrode with a first current collector. The method can electrically couple the first terminal with the first current collector. The method can expose a passivated portion of the first current collector to an electrolyte in contact with the first electrode.

At least one aspect is directed to an electric vehicle. The electric vehicle can include at least one battery cell. The battery cell can include an anode comprising a first region that is coated with an active material and a second region that lacks a coating of the active material. The battery cell can include a first terminal. The battery cell can include a first current collector that is electrically coupled to the second region of the first electrode and to the first terminal. The first current collector comprises aluminum and a passivated portion exposed to an electrolyte in contact with the anode. The battery cell can include a cathode. The battery cell can include a second current collector of the cathode exposed to the electrolyte and coupled to a second terminal. The cathode can include aluminum.

At least one aspect is directed to a method. The method can provide a battery cell. The battery cell can include an anode comprising an active material coating region and an uncoated region. The battery cell can include a first terminal and a first current collector. The first current collector can be electrically coupled to the uncoated region of the first electrode and the first terminal. The first current collector can include aluminum and a passivated portion exposed in an electrolyte comprising lithium. The electrolyte in contact with the anode. The battery cell can include a cathode and a second current collector of the cathode electrically exposed in the electrolyte and coupled to a second terminal. The cathode can include aluminum.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 5 is a flow diagram illustrating an example method of a battery cell in accordance with the system features of the present disclosure.

FIG. 6 is a flow diagram illustrating an example method of providing a battery cell in accordance with the system features of the present disclosure.

DETAILED DESCRIPTION

Figure 1:
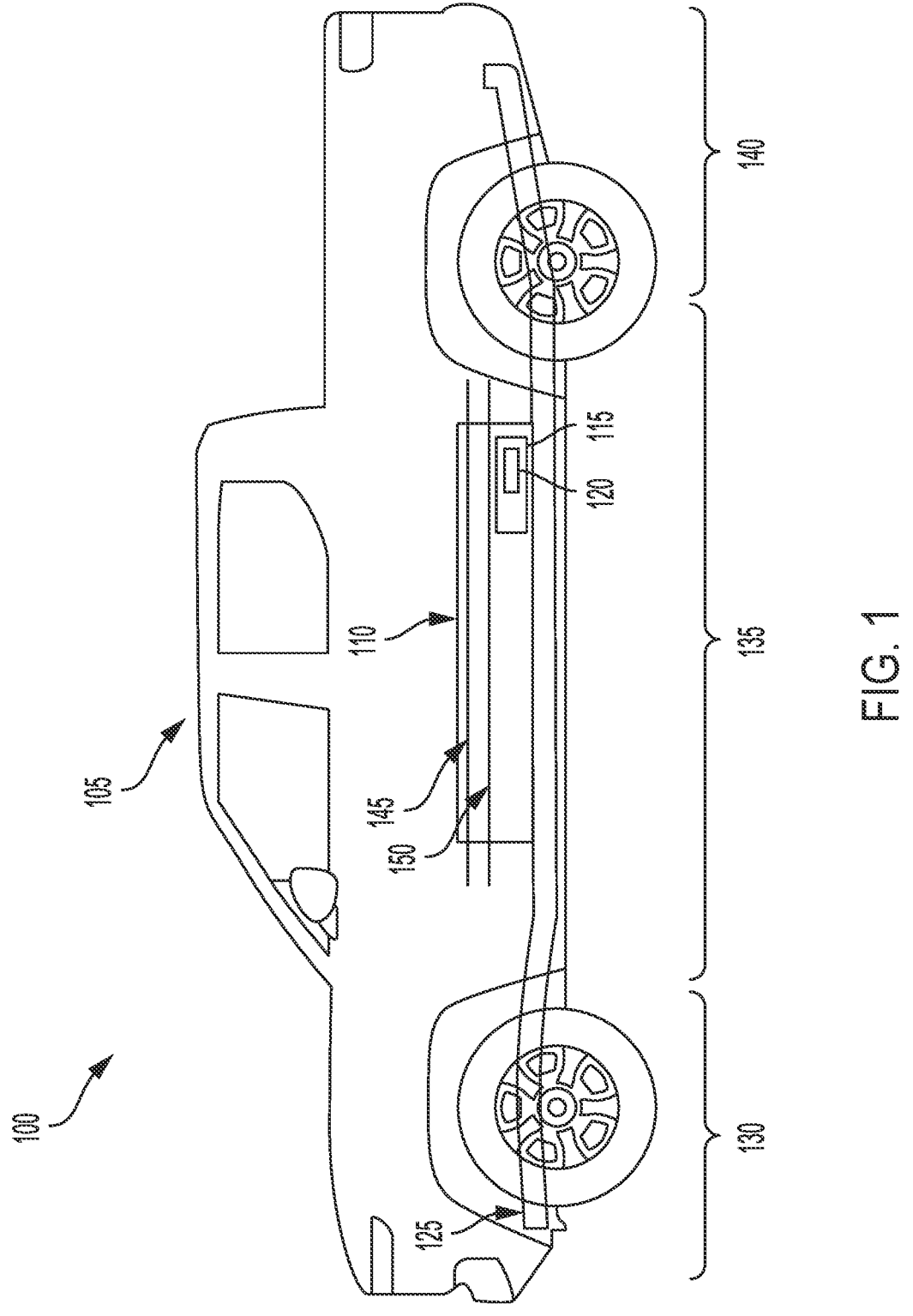
FIG. 1 depicts an example electric vehicle.

Following below are more detailed descriptions of various concepts related to, and implementations of, methods, apparatuses, and systems of a passivated current collector for a battery cell. The various concepts introduced above and discussed in greater detail below may be implemented in any of numerous ways.

The present disclosure is directed to systems and methods of providing a passivated current collector for a battery cell. As battery cells collect current from the electrolytes using current collectors, the current collectors both interact with the electrolytes as well as provide electrical path between the electrodes and the terminals. Most lithium ion battery cells include anode current collectors made from copper. As copper is electrically conductive and not reactive with lithium-based electrolyte, it can provide electrical continuity between the electrode generally without reacting with the electrolyte. However, making anode current collectors from copper can involve complex laser welds between copper components to other aluminum components, adding to the cost and complexity of the fabrication process. On the other hand, despite the fact that anode current collectors designed with aluminum could simplify the current collector fabrication, usage of aluminum in anode current collectors is avoided as aluminum is chemically reactive with the lithium-based electrolyte.

The disclosed solutions have a technical advantage of providing a battery cell whose anode current collector can include aluminum (and not copper), thereby simplifying the fabrication process while also providing an anode current collector that does not react with the lithium-based electrolyte. The present solution can include an anode having a passivated region preventing a chemical reaction between the aluminum of the anode and the lithium-based electrolyte. Since aluminum is lighter than copper, in addition to simplifying the fabrication process, the present solution also provides the anode, and thereby the battery cell, whose overall weight is reduced, thereby improving the battery cell's gravimetric energy density.

Systems and methods of the present technical solution can include a prismatic lithium-ion battery cell. The prismatic lithium ion battery cell can include an anode and a cathode that can each include a copper foil tab from the electrode to contact the respective current collector. For example, an anode side tab can contact the anode current collector from the anode active material region and a cathode side tab contacts the cathode current collector from the cathode active material region. The anode and cathode current collectors can each include or be aluminum current collectors. The anode current collector can be passivated with a material that is non-reactive to lithium-based electrolyte in order to prevent a chemical reaction between the lithium based electrolyte and the anode current collector. The passivated material that can be used to passivate the aluminum anode current collector can include any material non-reactive to lithium-based electrolytes, such as for example, copper, nickel, ceramic, polymer, or a metal oxide.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 2A:
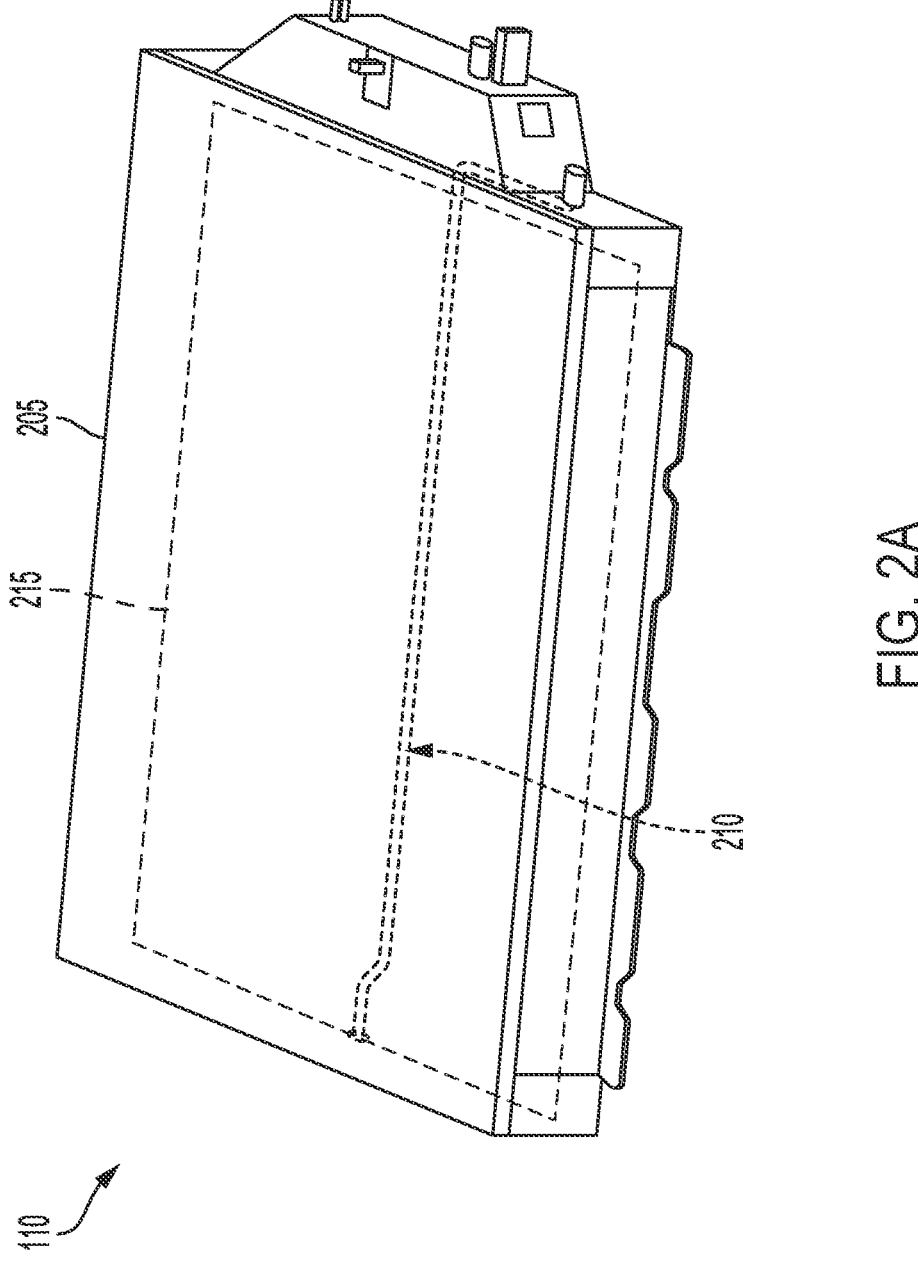
FIG. 2A depicts an example of one or more battery packs.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The housing 205 can include a shield on the bottom or underneath the battery module 115 to protect the battery module 115 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. The thermal component 215 can be positioned in relation to a top submodule and a bottom submodule, such as in between the top and bottom submodules, among other possibilities. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 2B:
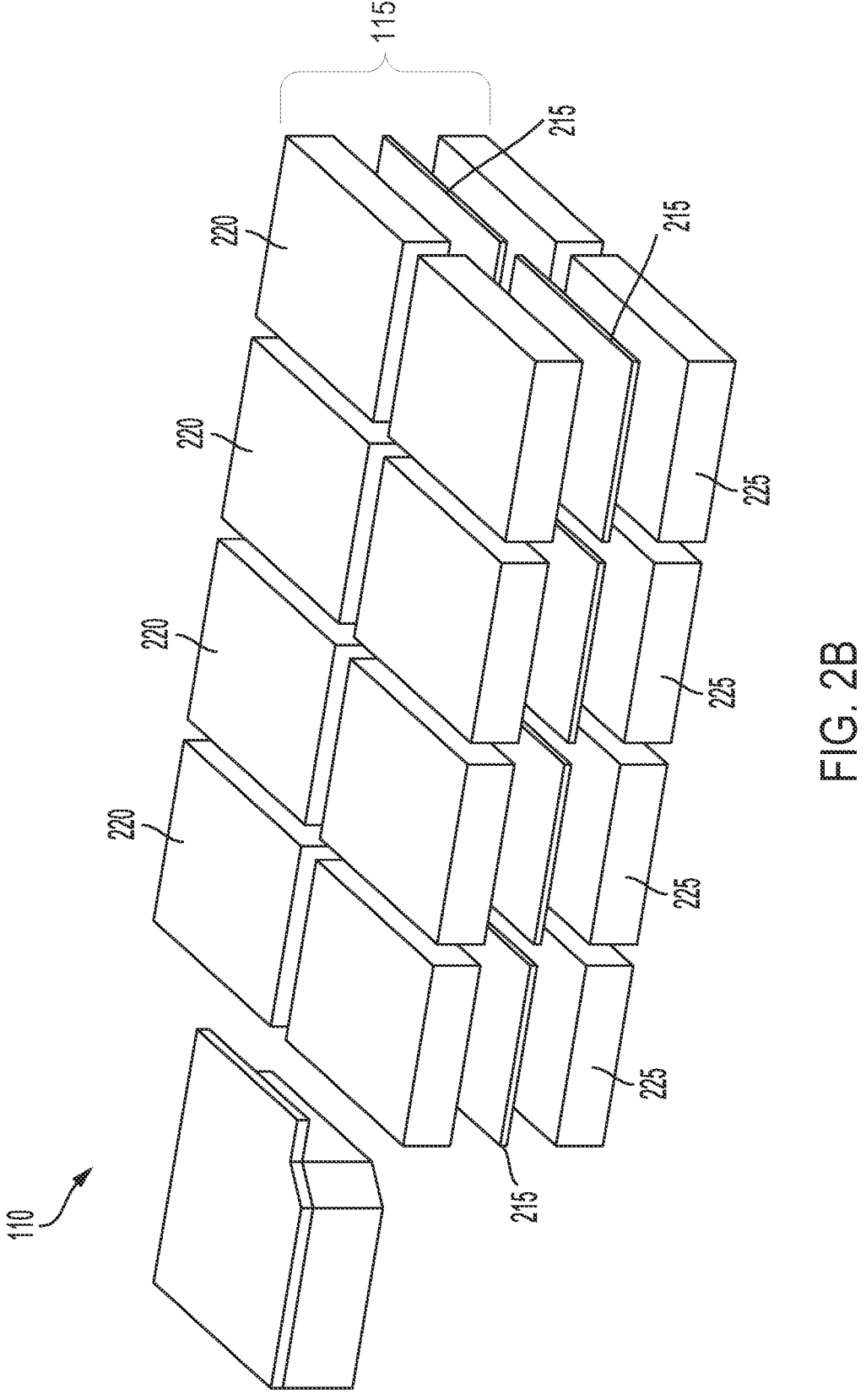
FIG. 2B depicts an example of one or more battery modules.
Figure 2C:
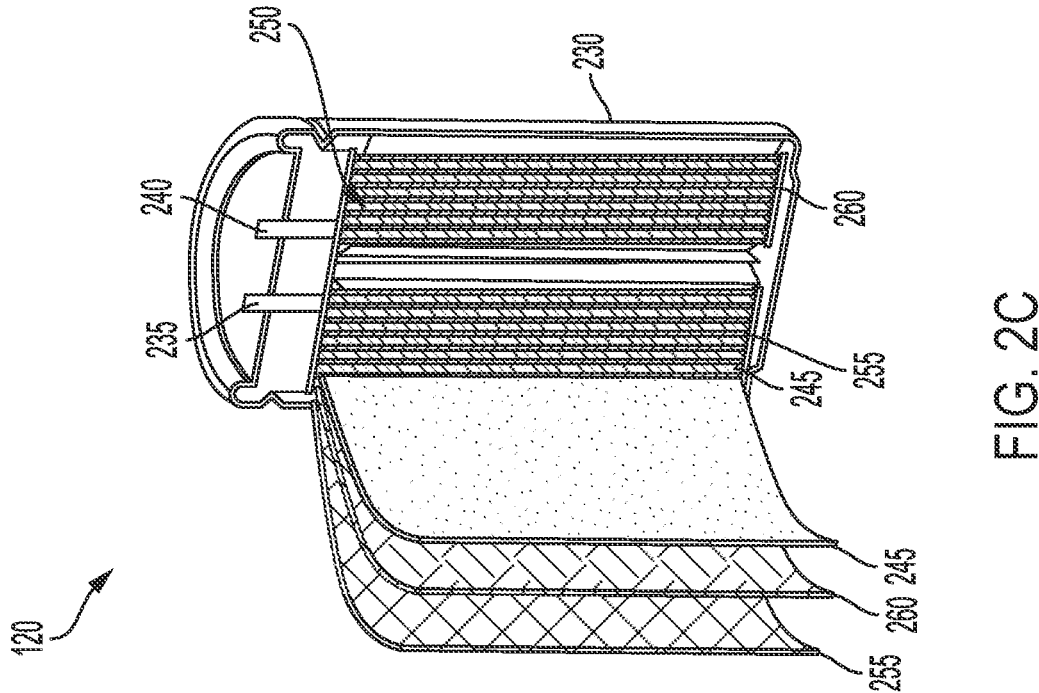
FIG. 2C depicts a cross sectional view of an example of a battery cell.
Figure 3A:
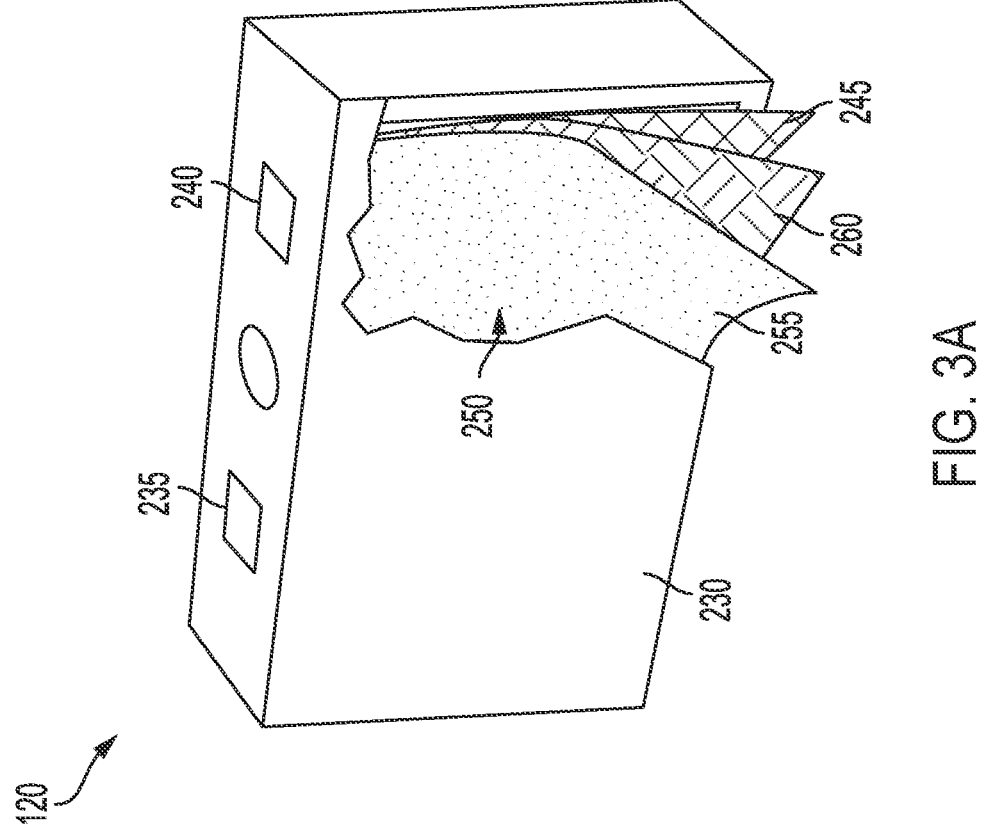
FIG. 3A depicts an example of one or more prismatic battery cells with anode and cathode components.
Figure 3B:
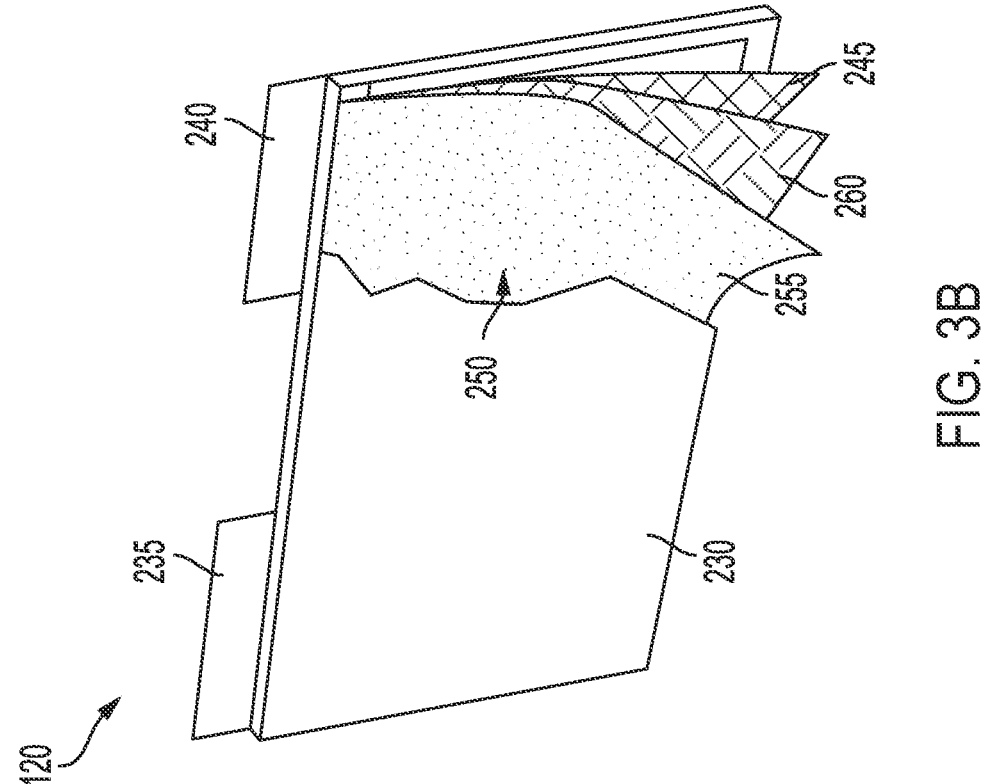
FIG. 3B depicts a cross sectional view of an example of a battery cell with a pouch form factor.

FIG. 2B depicts example battery modules 115, and FIGS. 2C, 3A and 3BE depict an example cross sectional view of a battery cell 120. The battery modules 115 can include at least one submodule. For example, the battery modules 115 can include at least one first (e.g., top) submodule 220 or at least one second (e.g., bottom) submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a thermal component 215 in between the top submodule 220 and the bottom submodule 225. The battery pack 110 can include or define a plurality of areas for positioning of the battery module 115. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

Battery cells 120 have a variety of form factors, shapes, or sizes. For example, battery cells 120 can have a cylindrical, rectangular, square, cubic, flat, pouch, or prismatic form factor. As depicted in FIG. 2C, for example, the battery cell 120 can be cylindrical. As depicted in FIG. 3A, for example, the battery cell 120 can be prismatic, such as having a cell whose chemistry is enclosed in a rigid casing, and where cells are usually stacked in columns. As depicted in FIG. 3B, for example, the battery cell 120 can include a pouch form factor. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can generate or provide electric power for the battery cell 120. The battery cell 120 can include an electrolyte layer where the electrolyte layer can be or include solid electrolyte material that can conduct ions. For example, the solid electrolyte layer can conduct ions without receiving a separate liquid electrolyte material. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can support conduction of ions between electrodes to generate or provide electric power for the battery cell 120. The housing 230 can be of various shapes, including cylindrical or rectangular, for example. Electrical connections can be made between the electrolyte material and components of the battery cell 120. For example, electrical connections to the electrodes with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

For example, the battery cell 120 can include a lithium-ion battery cells. In lithium-ion battery cells, lithium ions can transfer between a positive electrode and a negative electrode during charging and discharging of the battery cell. For example, the battery cell anode can include an anode active material like lithium or graphite, and the battery cell cathode can include a cathode active material like a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Solid electrodes or electrolytes can be or include organic polymeric-based electrolytes or inorganic electrolytes, for example phosphide-based or Sulfide-based solid-state electrolytes (e.g., $Li_3PS_4$, $Li_7P_3S_{11}$, $Li_2S-P_2S_5$, $Li_6PS_5Cl$). Yet further, some battery cells 120 can be solid state battery cells and other battery cells 120 can include liquid electrolytes for lithium-ion battery cells.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted in FIG. 2C, among others), elliptical, or ovular base, among others. The shape of the housing 230 can also be prismatic with a polygonal base, as shown in FIG. 3A, among others. As shown in FIG. 3B, among others, the housing 230 can include a pouch form factor. The housing 230 can include other form factors, such as a triangle, a square, a rectangle, a pentagon, and a hexagon, among others.

The housing 230 of the battery cell 120 can include one or more materials with various electrical conductivity or thermal conductivity, or a combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 230 of the battery cell 120 is prismatic (e.g., as depicted in FIG. 3A, among others) or cylindrical (e.g., as depicted in FIG. 2C, among others), the housing 230 can include a rigid or semi-rigid material such that the housing 230 is rigid or semi-rigid (e.g., not easily deformed or manipulated into another shape or form factor). In examples where the housing 230 includes a pouch form factor, (e.g., as depicted in FIG. 3B, among others), the housing 230 can include a flexible, malleable, or non-rigid material such that the housing 230 can be bent, deformed, manipulated into another form factor or shape.

The battery cell 120 can include at least one anode layer 245, which can be disposed within the cavity 250 defined by the housing 230. The one or more anode layers 245, which can also be referred to as anode 245, can include or utilize any one or more of: at least one current collector, at least one active material coating region, at least one terminal contact, at least one insulator layer and at least one gasket. The anode layer 245 can include a first redox potential. The anode layer 245 can receive electrical current into the battery cell 120 and output electrons during the operation of the battery cell 120 (e.g., charging or discharging of the battery cell 120). The anode layer 245 can include an active substance. The active substance can include, for example, an activated carbon or a material infused with conductive materials (e.g., artificial or natural Graphite, or blended), lithium titanate ($Li_4Ti_5O_{12}$), or a silicon-based material (e.g., silicon metal, oxide, carbide, pre-lithiated). The active substance can include graphitic carbon (e.g., ordered or disordered carbon with sp2 hybridization), Li metal anode, or a silicon-based carbon composite anode. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 120 can include at least one cathode layer 255 (e.g., a composite cathode layer compound cathode layer, a compound cathode, a composite cathode, or a cathode). The cathode layer 255, which can also be referred to as cathode 255, can include a second redox potential that can be different than the first redox potential of the anode layer 245. The cathode layer 255 can be disposed within the cavity 250. The cathode layer 255 can output electrical current out from the battery cell 120 and can receive electrons during the discharging of the battery cell 120. The cathode layer 255 can also release lithium ions during the discharging of the battery cell 120. Conversely, the cathode layer 255 can receive electrical current into the battery cell 120 and can output electrons during the charging of the battery cell 120. The cathode layer 255 can receive lithium ions during the charging of the battery cell 120.

The battery cell 120 can include an electrolyte layer 260 disposed within the cavity 250. The electrolyte layer 260 can be arranged between the anode layer 245 and the cathode layer 255 to separate the anode layer 245 and the cathode layer 255. The electrolyte layer 260 can transfer ions between the anode layer 245 and the cathode layer 255. The electrolyte layer 260 can transfer cations from the anode layer 245 to the cathode layer 255 during the operation of the battery cell 120. The electrolyte layer 260 can transfer anions (e.g., lithium ions) from the cathode layer 255 to the anode layer 245 during the operation of the battery cell 120.

The redox potential of layers (e.g., the first redox potential of the anode layer 245 or the second redox potential of the cathode layer 255) can vary based on a chemistry of the respective layer or a chemistry of the battery cell 120. For example, lithium-ion batteries can include an LFP (lithium iron phosphate) chemistry, an NMC (Nickel Manganese Cobalt) chemistry, an NCA (Nickel Cobalt Aluminum) chemistry, or an LCO (lithium cobalt oxide) chemistry for a cathode layer (e.g., the cathode layer 255). Lithium-ion batteries can include a graphite chemistry, a silicon-graphite chemistry, or a lithium metal chemistry for the anode layer (e.g., the anode layer 245). For example, a cathode layer having an LFP chemistry can have a redox potential of 3.45V, while an anode layer having a graphite chemistry can have a 0.25V redox potential.

Electrode layers can include anode active material or cathode active material, commonly in addition to a conductive carbon material, a binder, other additives as a coating on a current collector (metal foil). The chemical composition of the electrode layers can affect the redox potential of the electrode layers. For example, cathode layers (e.g., the cathode layer 255) can include high-nickel content (>80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LINMCA"), or lithium metal phosphates like lithium iron phosphate ("LFP") and Lithium iron manganese phosphate ("LMFP").

Anode active materials in anode layers (e.g., the anode layer 245) can include conductive carbon materials such as graphite, carbon black, carbon nanotubes, and the like. Anode layers can include Super P carbon black material, Ketjen Black®, Acetylene Black, SWCNT, MWCNT, graphite, carbon nanofiber, or graphene, for example.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, casein, chitosan, cyclodextrins (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly (vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The electrolyte layer 260 can include or be made of a liquid electrolyte material. For example, the electrolyte layer 260 can be or include at least one separator layer of polymeric material (e.g., polypropylene, polyethylene, or other material) that is wetted (e.g., is saturated with, is soaked with, receives) a liquid electrolyte substance. The separator layer can be wetted by electrolyte. For example, electrolyte can be applied, immersed, spread or otherwise present in at least a portion of the separator layer 260 or in all of the separator layer 260. The liquid electrolyte material can include a lithium salt dissolved in a solvent. When the lithium salt is dissolved in the solvent, the electrolyte can include lithium ions (i.e., cations) and anions (e.g., $PF_6^-$, $BF_4^-$) of the salt. The lithium salt for the liquid electrolyte material for the electrolyte layer 260 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others. The electrolyte layer 260 can include or be made of a solid electrolyte material, such as a ceramic electrolyte material, polymer electrolyte material, or a glassy electrolyte material, or among others, or any combination thereof. The ceramic electrolyte material for the electrolyte layer 260 can include, for example, lithium phosphorous oxy-nitride ($Li_xPO_yN_z$), lithium germanium phosphate sulfur ($Li_{10}GeP_2S_{12}$), Yttria-stabilized Zirconia (YSZ), NASICON ($Na_3Zr_2Si_2PO_{12}$), beta-alumina solid electrolyte (BASE), perovskite ceramics (e.g., strontium titanate ($SrTiO_3$)), among others. The polymer electrolyte material (e.g., a hybrid or pseudo-solid state electrolyte) for electrolyte layer 260 can include, for example, polyacrylonitrile (PAN), polyethylene oxide (PEO), polymethyl-methacrylate (PMMA), and polyvinylidene fluoride (PVDF), among others. Whether the electrolyte layer 260 is a separator layer that can receive a liquid electrolyte (e.g., lithium ion batteries) or an electrolyte layer that can conduct ions without receiving a liquid electrolyte (e.g., solid-state batteries), the glassy electrolyte material for the electrolyte layer 260 can include, for example, lithium sulfide-phosphor pentasulfide ($Li_2S$—$P_2S_5$), lithium sulfide-boron sulfide ($Li_2S$—$B_2S_3$), and Tin sulfide-phosphor pentasulfide ($SnS$—$P_2S_5$), among others.

In examples where the electrolyte layer 260 includes a liquid electrolyte material, the electrolyte layer 260 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The electrolyte layer 260 can include at least one additive. The additives can be or include vinylidene carbonate, fluoroethylene carbonate, ethyl propionate, methyl propionate, methyl acetate, ethyl acetate, or a mixture of any two or more thereof. The electrolyte layer 260 can include a lithium salt material. For example, the lithium salt can be lithium perchlorate, lithium hexafluorophosphate, lithium bis(fluorosulfonyl)imide, lithium bis(trifluorosulfonyl) imide, or a mixture of any two or more thereof. The lithium salt may be present in the electrolyte layer 260 from greater than 0 M to about 1.5 M.

Figure 4A:
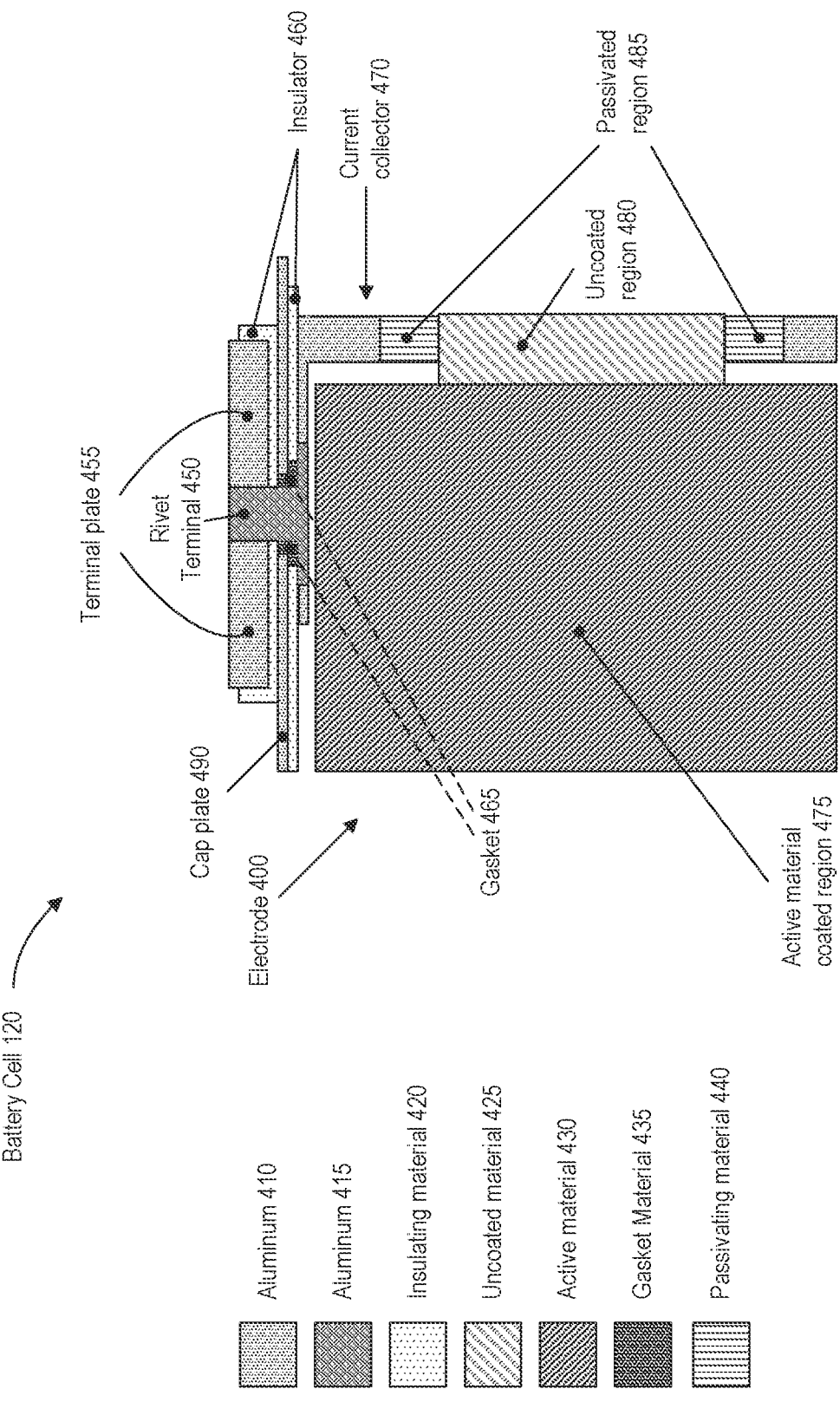
FIG. 4A is a block diagram illustrating an example of a battery cell having a passivated portion of an electrode.

FIG. 4A depicts an example battery cell 120. The example battery cell 120 can include a prismatic lithium-ion battery cell that can be deployed, used or installed in a vehicle 105. A battery cell 120 can include one or more electrodes 400. An electrode 400 can be, include or function as, an anode, such as an anode 245. Electrode 400 can be, include, or function as, a cathode, such as a cathode 255. The example illustrated in FIG. 4A can relate to an anode side of a battery cell 120 in which an electrical continuity or electrical contact is formed between the active material coated region 475 of the anode electrode 400 and the terminal of the battery, such as the rivet terminal 450 or terminal plate 455. The electrical contact or continuity can be formed from the active material coated region 475, via uncoated region 480, and to the current collector 470, via a passivated region 485 of the current collector 470. The current collector 470 can be in electrical contact with the rivet terminal 450, which can be in electrical contact with the terminal plate 455.

As shown in the example illustrated in FIG. 4A, the electrode 400 can include one or more active material coated regions 475 that can include, or carry thereon, one or more active materials 430. Electrode 400 can include one or more uncoated regions 480 that can include one or more uncoated materials 425. The one or more uncoated regions 480 can make or provide an electrical contact with one or more current collectors 470 of the battery cell 120. A current collector 470 can include or be made up of aluminum 410 material. The electrical contact or continuity between the one or more uncoated regions 480 and the one or more current collectors 470 can be made via one or more passivated regions 485. A passivated region 485 can include a passivating material 440. A current collector 470 can be in a physical or electrical contact with one or more rivet terminals 450. A rivet terminal 450 can include aluminum, such as aluminum 415. A rivet terminal 450 can be inserted through one or more gaskets 465. A gasket 465 can include or be made from a gasket material 435. The rivet terminal 450 can be inserted through one or more layers or sheets of insulator 460 which can include an insulating material 420, one or more cap plates 490 which can include aluminum 410 material and one or more a terminal plates 455 which can include aluminum 410 material. The battery cell 120 example of FIG. 4A can provide, for example, an anode side of a prismatic lithium-ion battery cell in which a lithium-based electrolyte of the electrode 400 can touch, interface, contact or otherwise interact with the aluminum current collector 470, via one or more passivated regions 485, without causing a chemical reaction between the lithium-based electrolyte and aluminum-based current collector 470.

Electrode 400 can include any electrical conductor that can be used to make contact with a nonmetallic part of an electrical circuit, such as an electrolyte for example. Electrode 400 can include one or more layers of materials. Electrode 400 can function as an anode 245 component through which current enters the electrical circuit of a battery cell 120 into a nonmetallic portion of the battery cell 120. Electrode can also function as an anode 245 component that releases current during discharge as the current exits the electrical circuit of the battery cell 120. Electrode 400 can function as a cathode 255 component through which current exists the electrical circuit of a battery cell 120. Electrode can also function as a cathode 255 component that receives or absorbs current during charging as the current enters the electrical circuit of the battery cell 120. Whether used as an anode 245 or a cathode 255, the electrode 400 can both release or receive electrons from the external circuitry, depending on whether the electrode 400 is being charged or discharged. Electrode 400 can include an active material coated region 475 and an uncoated region 480.

An active material coated region 475 can include one or more layers or coatings of active materials 430. An active material 430 can include any one or more anode active material or a cathode active material. When electrode 400 is an anode 245, electrode 400 can include one or more foils or sheets of material that can be coated with, or include, one or more layers or coatings of active materials 430 for a cathode, such as conductive carbon materials, including graphite, carbon black or carbon nanotubes. Active materials 430 in an anode 245 can include, for example, Super P carbon black material, Ketjen Black®, Acetylene Black, SWCNT, MWCNT, graphite, carbon nanofiber, or graphene, as well as any other active materials used in anodes 245 of battery cells.

When electrode 400 is a cathode 255, electrode 400 can include one or more foils or sheets of material that can be coated with, or include, one or more layers or coatings of active materials 430 for a cathode, such as high-nickel content (>80% Ni) lithium transition metal oxide, a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and Lithium iron manganese phosphate ("LMFP").

Uncoated region 480 can include one or more materials, such as foils or sheets, that do not include, or carry thereon, any active material 430. Uncoated region can include metal foils or sheets, including for example copper or nickel foils or sheets. Uncoated region 480 can be in electrical contact or a physical contact with an active material coated region 475. Uncoated region 480 can provide, establish or create an electrical contact or continuity between active material coated region 475 and the current collector 470, via a passivated region 485.

Uncoated region 480 can include a tab. The tab can be formed from a foil, such as a copper foil. Uncoated region 480 can include a metal sheet or a foil that can be in an electrical contact with one or more components of the electrode 400, such as the active material coated region 475. The metal sheet or foil can include a tab at an end of the foil. The tab can be shaped, configured or used to make or provide an electrical contact with the current collector 470. The tab can be shaped, configured or used to make or provide an electrical or physical contact with passivated region 485 of the current collector 470.

Current collector 470 can include any component that collects electrical current generated at the electrode 400 and provides the electrical current to the terminal of the battery cell. For example, a current collector 470 can include any one or more components or pieces that provide electrical continuity or electrical contact between the electrode 400 and a terminal, such as a terminal 235 or terminal 240. The current collector 470 can be in electrical or physical contact with the uncoated region 480 of the electrode 400 and also be in electrical or physical contact with the rivet terminal 450.

Current collector 470 can include, or be made from, aluminum, such as aluminum 410. Aluminum 410 can include any type or form of aluminum material, such as 3003 aluminum, 6061 aluminum, 1100 aluminum, or any other type and form of aluminum, or an aluminum alloy used in the industry. Current collector 470 can be electrically conductive and establish, provide or form an electrical contact or connection with each one of active material coated region 475, uncoated region 480, the rivet terminal 450 and the terminal plate 455. Current collector 470 can establish, provide or maintain electrical continuity or contact from the electrode 400 to the rivet terminal 450, via active material coated region 475, uncoated region 480, passivated region 485 and a portion of current collector 470 between the passivated region 485 and rivet terminal 450. While current collector 470 is illustrated with "L" shaped geometry, it is understood that current collector 470, as well as other components discussed herein, can include different shapes and geometries.

Passivated region 485 can include a portion of the current collector 470 comprising a coating or a layer of passivating material 440. The coating or layer of passivating material 440 can be applied by, for example, atomic layer deposition, spin coating, chemical solution deposition, plating, chemical vapor deposition, or any other techniques known or used for creating coatings or thin films. Passivated region 485 can include any passivating material 440 that is non-reactive with the electrolyte of the battery. For example, passivating material 440 can include any one or more, or a combination of, a copper, nickel, metal oxide, polymer or ceramic. Passivating material 440 can include a metal alloy comprising a combination of different materials.

Passivated region 485 can include any portion of a current collector 470. The passivated region 485 can be less than the entire current collector 470. The passivated region 485 can be the entire current collector 470. For example, passivated region 485 can include an area or a region of the current collector 470 which the electrode 400 (e.g., uncoated region 480) is going to touch, contact or interact with. Passivated region or portion 485 can be exposed to the electrolyte, via the uncoated region 480 (e.g., the tab of the metal foil from the electrode in a notched electrode or simply an uncoated region for an electrode without notching). Passivated region 485 can include area or region that is wider or broader than the area or region that uncoated region 480 is to contact. The passivated region 485 can include the contact region which the uncoated region 480 (e.g., metal foil or a tab) is to contact, touch or interact with. Passivated region 485 can include the entire surface or area of the current collector 475 that is exposed to electrolyte, either liquid or vapor. The passivated region 485 can include or cover a part of the current collector 470 or the entire current collector 470. The passivated region 485 can include the entire current collector except for the portion of the current collector being welded or connected to the terminal, such as the rivet terminal 450.

Rivet terminal 450 can include an electrically conductive component forming at least a portion of a terminal for an electrode 400 of a battery cell 120. Rivet terminal 450 can include aluminum 415 material. Aluminum 415 can include can include any type and form of aluminum as aluminum 410. Aluminum 415 can include the same or a different type of aluminum as the aluminum 410. For example, rivet terminal 450 can be made from aluminum 415 and the current collector 470 can be made from the same or a different aluminum 410 as the aluminum 415. Rivet terminal 450 can include a single metal component or multiple metal components that can be assembled to form a rivet terminal 450. Rivet terminal 450 can be a single component made up of a single type of metal, such as aluminum 410 (or 415) material with no addition other metal parts, such as copper parts added or used in the construction of the rivet terminal 450. Rivet terminal 450 can be inserted through a gasket 465, one or more insulators 460, a cap plate 490 and a terminal plate 455. Rivet terminal 450 can be welded, soldered, bonded or otherwise connected with the current collector 470. Rivet terminal 450 can be laser welded with terminal plate 455.

Gasket 465 can include any gasket, such as a seal gasket, that can be used in a battery cell 120. Gasket 465 can include rubber, plastic, silicone or a polyurethane foam or any other similar material that can seal the internal portions of the battery cell 120 from the exterior. Gasket 465 can provide sealing for the electrolyte to prevent or reduce the evaporation of electrolyte out of the battery cell 120.

Cap plate 490 can include a plate of metal, such as aluminum 410, although other metals can be used. Cap plate 490 can include a through-hole through which rivet terminal 450 can be inserted. Cap plate 490 can provide structural or mechanical support to the battery cell 120.

Insulator 460, or insulator layer 460, can include any electrical insulation comprising insulating material 420. Insulator 460 can include a plate made from insulating material 420 with a through hole for the rivet terminal 450. Insulating material 420 can include a plastic, a rubber, a rubber, a polymer, a ceramic or any other type and form of electrical insulator.

Terminal plate 455 can include any metal plate through which a rivet terminal 450 can be inserted, or with which a rivet terminal 450 can be combined or connected. Terminal plate 455 can include aluminum, such as aluminum 410 or aluminum 415. Terminal plate 455 can be in an electrical contact with the electrode 400. Terminal plate 455 can be in electrical continuity with the active material coated region 475 of the electrode 400 via rivet terminal 450, current collector 470, passivated region 485 and uncoated region 480 that can connect to active material coated region 475. Terminal plate 455 can be welded, soldered, bonded or otherwise connected with rivet terminal 450. Terminal plate

455 and rivet terminal 450 can be fused into a single part or component to form a rivetless terminal for the electrode 400.

Although FIG. 4A illustrates one side of a battery cell 120 in which a single electrode 400 is shown (e.g., anode 245), the battery cell 120 can include a second electrode 400 (e.g., 255) that can include the same or a similar structure as the one shown in the example of FIG. 4A. For example, in addition to a first electrode 400 (e.g., anode 245), the battery cell 120 can include a second electrode (e.g., cathode 255) that can include the same or similar components as those illustrated in FIG. 4A. For example, a battery cell 120 can include a second electrode 400 that can have its own (e.g., cathode-side) active material coated region 475 with its (e.g., cathode-side) own active materials 430 that can be in electrical contact with the (e.g., cathode-side) uncoated region 480. The uncoated region of the second electrode can include a foil tab or a sheet in electrical contact with the (e.g., cathode-side) current collector 470 of the second electrode. The current collector 470 of the second electrode can include aluminum or other material. The current collector 470 of the second electrode can include a passivated region 485. The current collector 470 of the second electrode can be in electrical contact (e.g., welded or soldered) with the rivet terminal 450 of the second electrode. The rivet terminal 450 of the second electrode can be welded, soldered or connected to the terminal plate 455 of the second electrode.

For example, the present solution can relate to a battery cell 120. The battery cell 120 can include a first electrode (e.g., 400) that can include a first region (e.g., 475) that can be coated with an active material (e.g., 430). The first electrode 400 can include a second region (e.g., 480) that lacks a coating of the active material (e.g. 430). The second region can include, for example, a copper foil or a sheet. The battery cell 120 can include a first terminal (e.g., 450 or 455). For example, the first terminal can include a rivet terminal 450, terminal plate 455, or a combination of the rivet terminal 450 and a terminal plate 455. Battery cell 120 can include a first current collector (e.g., 470). The first current collector 470 can be electrically coupled to the second region (e.g., 480) of the first electrode (e.g., 400). The first current collector 470 can be electrically coupled to the first region (e.g., 470) via the second region (e.g., 480). The current collector 470 can be electrically coupled to the first terminal (e.g., 450 or 455). The current collector 470 can be welded to the first terminal (e.g., 450). The first current collector 470 can include a passivated portion (e.g., 485). The passivated portion (e.g., 485) can include a coating or a layer of passivating material 440 deposited, formed, coated or otherwise applied to the outer surface of the current collector 470. The passivated portion (e.g., 485) can be exposed to an electrolyte of the battery cell 120. The passivated portion (e.g., 485) can be in contact with the first electrode (e.g., 440).

Battery cell 120 can include the first electrode (e.g. 400) that is an anode (e.g. 245). Battery cell 120 can include the first terminal (e.g., 450 or 455) that is an anode terminal (e.g., 235). Battery cell 120 can include or be a prismatic battery cell. The prismatic battery cell can include the first current collector (e.g., 470) that can include aluminum material, such as aluminum 410 or 415. The prismatic battery cell can include the electrolyte that can include lithium ions.

Battery cell 120 can include the first current collector (e.g., 470) that can include aluminum (e.g., 410 or 415). The battery cell 120 can include a second electrode (e.g., 400) that can include a second current collector (e.g., 470)

electrically coupled to a second terminal (e.g., 450 or 455), wherein the second electrode (e.g., 440) is a cathode (e.g., 255) comprising aluminum (e.g., 410 or 415). For example, cathode (e.g., 255) can include aluminum foil coated with a cathode active material.

Battery cell 120 can include a passivated portion (e.g., 485) that can include a material different from aluminum (e.g., 410 or 415). Passivated portion (e.g., 485) can include passivating material 440. Battery cell 120 can include the electrolyte that can include lithium. Battery cell 120 can include the passivated portion (e.g., 485) that can include at least one of copper or nickel. Battery cell 120 can include the passivated portion (e.g., 485) that can include at least one of polymer or ceramic. Battery cell 120 can include the first current collector (e.g., 470) comprising aluminum (e.g., 410 or 415) and the passivated portion (e.g., 485) that can include material (e.g., 440) that does not react with the electrolyte.

Battery cell 120 can include the first terminal (e.g., 440) that can include an aluminum rivet (e.g., 450) that can be inserted through an insulator layer (e.g., 460) and through a gasket (e.g., 465) that is disposed between the first terminal (e.g., 450) and a cap plate (e.g., 490). Battery cell 120 can include the first current collector (e.g., 470) that can be welded to the first terminal (e.g., 450). The first current collector (e.g., 470) and the first terminal (e.g., 450) can comprise aluminum (e.g., 410 or 415) and the first electrode (e.g., 440) can be an anode (e.g., 245). Battery cell 120 can include a terminal plate (e.g., 455) that can be welded to the first terminal (e.g., 455) and a gasket (e.g., 465) that can interface with a cap plate (e.g., 490) and an insulator (e.g., 460).

Battery cell 120 can include the first electrode (e.g., 400) that can include a plurality of foils coated with the active material (e.g., 430). For example, the first electrode 400 can include a plurality of metal foils, where one or more or each one of the plurality of metal foils can have or include first regions coated with the active material and second regions lacking an active material coating (e.g., 630). Battery cell 120 can include the first region (e.g., 475) that can include an electrode active material, such as an anode active material like graphite or a cathode active material like LPF or NCM. Battery cell 12 can include the first region (e.g., 475) that can include a binder and a conductive carbon. Battery cell 120 can include the second region (e.g., 480) that can include a notched current collector foil. The current collector foil can include a copper foil comprising a tab that can interface with or contact the current collector 470, via uncoated region 480.

The present solution can relate to an electric vehicle 102 that can include a battery cell 120 having an anode (e.g., 245) electrode. The anode (e.g., 245) can include a first region (e.g., 275) that can be coated with an active material (e.g., 430) and a second region (e.g., 480) that lacks a coating of the active material (e.g., 430). The anode (e.g., 245) can include a first terminal (e.g., 450, 455) and a first current collector (e.g., 470) that can be electrically coupled to the second region (e.g., 480) of the first electrode (e.g., 440) and the first terminal (e.g., 475). The first current collector (e.g., 470) can include aluminum (e.g., 410, 415). The first current collector can include a passivated portion (e.g., 485) that can be exposed to an electrolyte in contact with the anode (e.g., 245).

The battery cell can include a cathode (e.g., 255). The battery cell can include a second current collector (e.g., 470) of the cathode (e.g., 255) that can be exposed to the electrolyte and coupled to a second terminal (e.g., 450 of the cathode 255) of the cathode. The cathode 255 can include aluminum. The battery cell can include the electrolyte comprising lithium or lithium ions and the passivated portion (e.g., 485) that can include a coating on the first current collector (e.g., 470 on the anode-side). The coating can include at least one of: copper, nickel, polymer or ceramic.

Figure 4B:
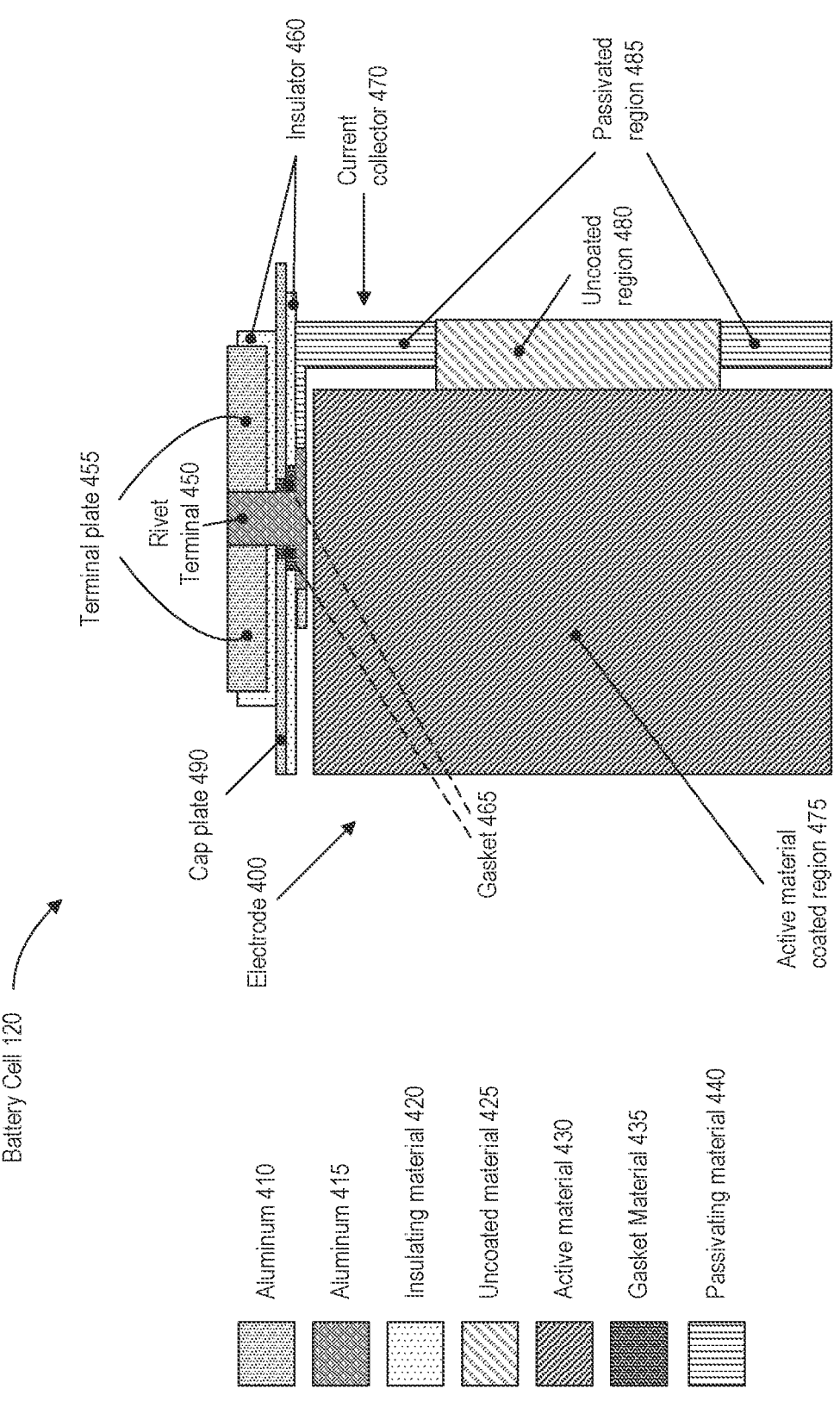
FIG. 4B is a block diagram illustrating an example of a battery cell having an entirely passivated electrode.

FIG. 4B depicts an example battery cell 120 in which the entire current collector 470 is covered, coated, treated or otherwise includes passivated region 485. As shown in FIG. 4B, the battery cell 120 can include one or more electrodes 400 that include or function as a cathode 255 or an anode 245. Active material coated region 475 of the electrode 400 can be in electrical continuity or contact to the rivet terminal 450 and the terminal plate 455. The electrical continuity or contact can extend from the active material coated region 475, via uncoated region 480, and to the current collector 470 that is entirely covered, treated or otherwise passivated by the passivated region 485. The current collector 470 can be in electrical contact with the rivet terminal 450 that can also be in electrical contact with the terminal plate 455. As such, the electrical continuity or electrical coupling between the electrode 400 and the rivet terminal 450 can be formed, provided or otherwise maintained by the current collector 470 that is entirely coated or covered with the passivated region 485 or otherwise is passivated in its entirety.

FIG. 5 illustrates a method 500 for a battery cell 120, such as for example a method for providing or creating a battery cell 120. At ACT 505, the method 500 can include providing an electrode. At ACT 510, the method 500 can include providing a terminal. At ACT 515, the method 500 can include electrically coupling a second region with a current collector. At ACT 520, the method can include electrically coupling the terminal with the current collector. At ACT 525, the method can include exposing a passivated portion to electrolyte.

At ACT 510, the method 500 can include providing a terminal. The electrode can include an anode. The electrode can include a cathode. The first electrode can include a first region that is coated with an active material and a second region that lacks a coating of the active material. The first electrode can include a first region comprising active material coated region having a coating of an active material for an anode of a battery cell, or a cathode of a battery cell. The active material can include conductive carbon materials, such as, graphite, carbon black, carbon nanotubes. Active materials can include Super P carbon black material, Ketjen Black, Acetylene Black, SWCNT, MWCNT, graphite, carbon nanofiber, or graphene. The second region can include a foil of a sheet of material, such as copper or nickel. The second region can be in physical or electrical contact with the first region. Active materials can include, for example, high-nickel content (>80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and Lithium iron manganese phosphate ("LMFP").

At ACT 510, the method 500 can include providing a terminal. The method can provide a first terminal, which can include, for example, a rivet terminal, a terminal plate or a combination of rivet terminal and terminal plate. A first terminal can include a rivetless terminal. The rivetless terminal can include an electrically conductive material in electrical contact with the current collector. The current collector can include aluminum material. The rivet terminal can include aluminum material. Terminal plate can include aluminum material. The first terminal can be welded to the current collector. The first terminal can include the rivet terminal welded to the terminal plate. The first terminal can be inserted through a gasket, one or more insulating layers and a cap plate. The first terminal can include a rivet terminal inserted through a terminal plate.

At ACT 515, the method 500 can include electrically coupling a second region with a current collector. The first current collector can be electrically coupled with the second region of the first electrode. The first current collector can be in physical contact with the second region of the first electrode. The second region can include foil or a sheet of electrically conductive material, such a copper foil. The foil or a sheet can include a tab. The foil or the sheet of the second region, including for example the tab, can contact, touch or be in electrical contact with the current collector. The coil or the sheet can provide, establish or maintain an electrical contact with the current collector via a passivated region or portion. The passivated region or portion can include electrically conductive coating. The passivated region or portion can include a coating or layer that does not sever electrical continuity between the second region and the current collector. The passivated region or portion can include or cover a portion of a current collector or the entire current collector. The passivated region or portion can include a portion of the current collector within which uncoated region of the electrode contacts the current collector.

At ACT 520, the method can include electrically coupling the terminal with the current collector. The first terminal can be electrically coupled with the first current collector. The rivet terminal of the first terminal can be welded, soldered, connected or otherwise attached to a portion of the current collector. The first terminal can comprise the same material as the current collector and the welding between the first terminal and the current collector can include welding of the same materials. The first terminal can include aluminum and the current collector can include aluminum. The first terminal can be laser welded to the current collector. The battery cell can be a lithium ion prismatic battery cell. The first electrode can be an anode. The first terminal can be an anode terminal. The first current collector can include aluminum. The electrolyte can include lithium or lithium ions.

At ACT 525, the method can include exposing a passivated portion to electrolyte. A passivated portion of the first current collector can be exposed to an electrolyte that can be in contact with the first electrode. The passivated portion can include a coating or a layer of passivating material, such as copper, nickel, ceramic, polymer, metal oxide or any other material that does not react with lithium. The electrolyte can include lithium. The electrolyte can be in contact with the first electrode. The electrolyte can be in contact with the active material coated region of the first electrode. The electrolyte can be in contact with the uncoated region of the first electrode.

The first electrode can be an anode. The method can include providing a second electrode that can include a second current collector that can be electrically coupled to a second terminal. The second electrode can be a cathode. The cathode can include aluminum. A portion of the second current collector can be exposed to the electrolyte in contact with the second electrode.

Figure 6:
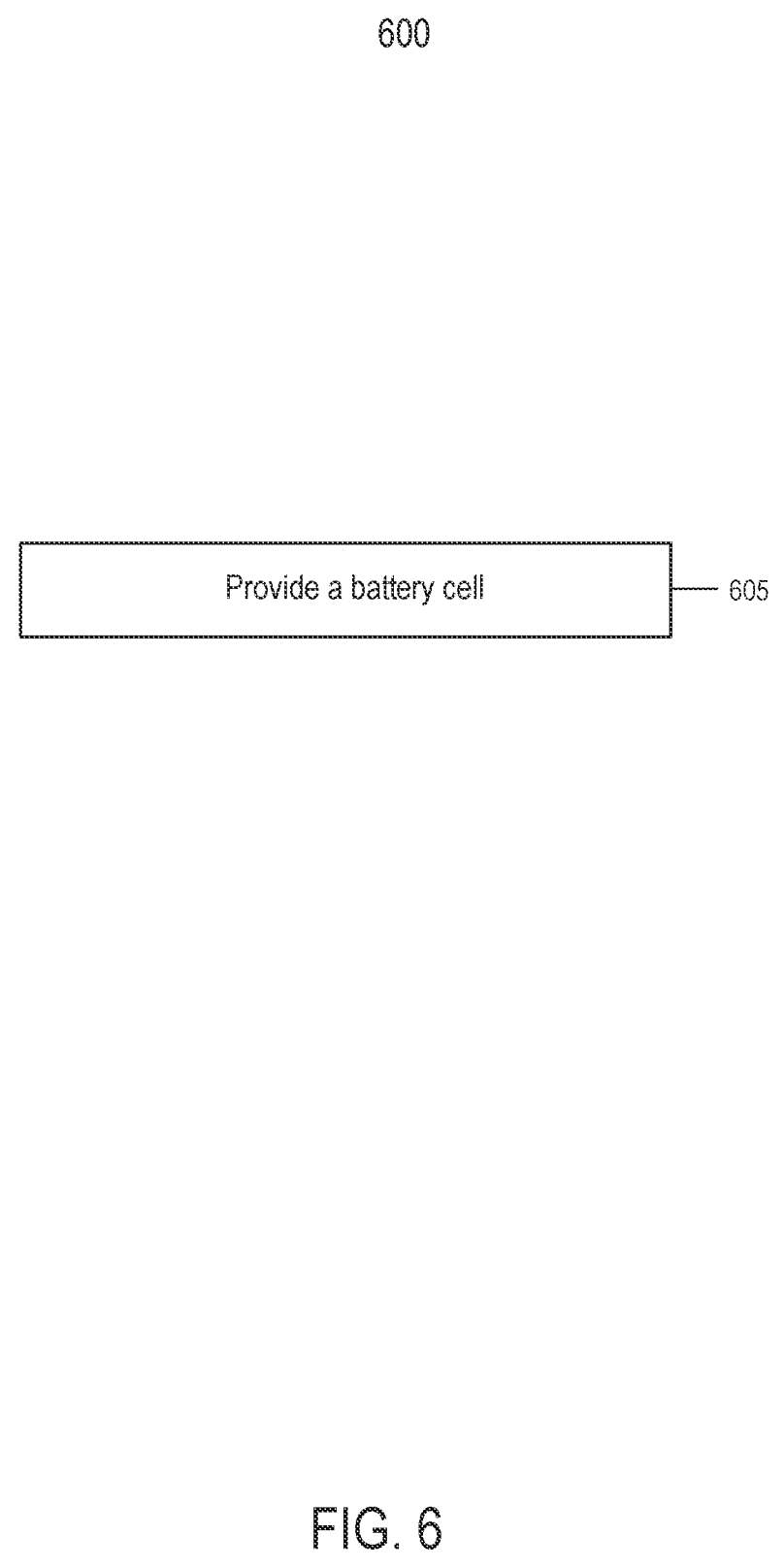

FIG. 6 illustrates a method 600 of providing a battery cell 120, such as for example a battery cell 120 illustrated in FIG. 4A. The method 600 can include act 605 of providing a battery cell. At act 605, method 600 can provide a battery cell. The battery cell can include an anode including an active material coating region and an uncoated region, a first terminal and a first current collector. The first current collector can be electrically coupled to the uncoated region of the first electrode and the first terminal. The first current collector can include aluminum and a passivated portion exposed in an electrolyte comprising lithium. The electrolyte can be in contact with the anode. The battery cell can include a cathode and a second current collector of the cathode electrically exposed in the electrolyte and coupled to a second terminal. The cathode can include aluminum.

Some of the description herein emphasizes the structural independence of the aspects of the system components or groupings of operations and responsibilities of these system components. Other groupings that execute similar overall operations are within the scope of the present application.

The systems described above can provide multiple ones of any or each of those components and these components can be provided on either a standalone system or on multiple instantiation in a distributed system. In addition, the systems and methods described above can be provided as one or more electrodes, current collectors, regions or terminals embodied on or in one or more articles of manufacture that can be combined or fabricated as stand-alone components or multiple components.

Example and non-limiting module implementation elements can include battery components that can include electrical contacts, foils, materials, electrolytes, connectors or contacts, various parts of electrodes, current collectors or terminals which can be used in the industry for various designs.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. For example, positive electrode and negative electrodes can be reversed, such as for example an anode and a cathode of a battery cell. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A battery cell, comprising:
a first electrode comprising a first region that is coated with an active material and a second region comprising a first side and a second side that both lack a coating of the active material;
a first terminal; and
a first current collector comprising a portion of an outer surface onto which a layer of a passivating material is applied to form:
    a first passivated portion electrically coupling the first current collector with the first side of the second region along a first axis for which both the first current collector and the second region span; and
    a second passivated portion electrically coupled with the second side of the second region along the first axis, wherein the second region of the first electrode and the first terminal are electrically coupled via the first passivated portion, and wherein the first passivated portion and the second passivated portion are exposed to an electrolyte in contact with the first electrode;
    wherein the second region and the layer of the passivating material extend away from the first terminal.

2. The battery cell of claim 1, wherein the first electrode is an anode of the battery cell, and the first terminal is an anode terminal of the battery cell.

3. The battery cell of claim 2, wherein the battery cell is a prismatic battery cell comprising:
the first current collector comprising aluminum; and
the electrolyte comprising lithium ions, wherein the first passivated portion and the second passivated portion reduce reactions between the electrolyte and the aluminum of the first current collector.

4. The battery cell of claim 2, comprising:
the first current collector comprising aluminum; and
a second electrode comprising a second current collector electrically coupled to a second terminal, wherein the second electrode is a cathode comprising an aluminum foil coated with a cathode active material.

5. The battery cell of claim 1, wherein the first passivated portion or the second passivated portion comprises material different from aluminum and the electrolyte comprises lithium ions.

6. The battery cell of claim 1, comprising:
the first passivated portion or the second passivated portion comprising at least one of copper or nickel.

7. The battery cell of claim 1, comprising:
the first passivated portion or the second passivated portion comprising at least one of polymer or ceramic.

8. The battery cell of claim 1, comprising:
the first current collector comprising aluminum; and
the first passivated portion or the second passivated portion comprising material that does not react with the electrolyte.

9. The battery cell of claim 1, comprising:
the first terminal comprising an aluminum rivet inserted through an insulator layer and through a gasket that is disposed between the first terminal and a cap plate.

10. The battery cell of claim 1, comprising:
the first current collector welded to the first terminal, wherein the first current collector and the first terminal comprise aluminum, and the first electrode is an anode.

11. The battery cell of claim 1, comprising:
a terminal plate welded to the first terminal; and
a gasket that interfaces with a cap plate and an insulator.

12. The battery cell of claim 1, wherein the first electrode comprises a plurality of metal foils, wherein each of the plurality of metal foils have first regions coated with the active material and second regions lacking an active material coating.

13. The battery cell of claim 1, wherein the first region includes an electrode active material, a binder and a conductive carbon.

14. The battery cell of claim 1, wherein the second region includes a notched current collector foil.

15. A method, comprising:
providing a first electrode of a battery cell comprising a first region that is coated with an active material and a second region comprising a first side and a second side that both lack a coating of the active material;
providing a first terminal;
electrically coupling the first side of the second region of the first electrode with a first passivated portion of a first current collector along a first axis for which both the first current collector and the second region span;
electrically coupling the second side of the second region with a second passivated portion of the first current collector along the first axis; and
exposing the first passivated portion and the second passivated portion to an electrolyte in contact with the first electrode;
wherein the second region and a layer of a passivating material extend away from the first terminal.

16. The method of claim 15, wherein the battery cell is a lithium ion prismatic battery cell, the first electrode is an anode, the first terminal is an anode terminal, the first current collector comprises aluminum, and the electrolyte comprises lithium ions.

17. The method of claim 15, wherein the first passivated portion or the second passivated portion comprises at least one of copper, nickel, polymer or ceramic.

18. The method of claim 15, wherein the first electrode is an anode, and the method comprises:
providing a second electrode comprising a second current collector electrically coupled to a second terminal, wherein the second electrode is a cathode comprising aluminum; and
exposing a portion of the second current collector to the electrolyte in contact with the second electrode.

19. An electric vehicle, comprising:
a battery cell comprising:
    an anode comprising a first region that is coated with an active material and a second region comprising a first side and a second side that both lack a coating of the active material;
    a first terminal;
    a first current collector comprising aluminum and a portion of an outer surface onto which a layer of a passivating material is applied to form:
    a first passivated portion electrically coupling the first current collector with the first side of the second region along a first axis for which both the first current collector and the second region span; and
    a second passivated portion electrically coupled with the second side of the second region along the first axis, wherein the second region of a first electrode and the first terminal are electrically coupled via the first passivated portion, and wherein the first passivated portion and the second passivated portion are exposed to an electrolyte in contact with the anode;

wherein the second region and the layer of the passivating material extend away from the first terminal;

a cathode; and a second current collector of the cathode exposed to the electrolyte and coupled to a second terminal, wherein the cathode comprises aluminum.

20. The electric vehicle of claim 19, comprising:

the electrolyte comprising lithium ions, wherein the first passivated portion and the second passivated portion reduce reactions between the electrolyte and the aluminum of the first current collector; and the first passivated portion or the second passivated portion comprising a coating on the first current collector, the coating comprising at least one of: copper, nickel, polymer or ceramic.

* * * * *